United States Patent

[11] 3,576,485

[72] Inventors Horace W. Coons, Jr.
Erie, Pa.;
James L. Erb, Kadima, Nigeria
[21] Appl. No. 9,459
[22] Filed May 5, 1969
[45] Patented Apr. 27, 1971
[73] Assignee General Electric Company

[54] FAULT DETECTION CIRCUIT FOR THE FEEDBACK OF A CONTROL SYSTEM
8 Claims, 2 Drawing Figs.

[52] U.S. Cl. .................................................. 318/434,
317/13, 317/19, 318/327, 318/332
[51] Int. Cl. ...................................................... H02p 3/00
[50] Field of Search............................................ 318/278,
326, 327, 336, 332, 345, 434; 317/13, 19

[56] References Cited
UNITED STATES PATENTS
3,350,616 10/1967 Greening........................ 318/327
3,465,227 9/1969 Ivie................................. 318/434

Primary Examiner—Oris L. Rader
Assistant Examiner—Thomas Langer
Attorneys—James C. Davis, Jr., Edward W. Goebel, Jr. and Joseph B. Forman ABSTRACT: To protect a DC adjustable speed motor against rotation at excessive speeds, a fault detection circuit prevents the motor from being energized by a motor control system unless a speed feedback circuit is complete prior to startup of the motor by causing a normally energized switch to be biased to a deenergized state, preventing the motor control system from energizing the motor, when the feedback circuit is incomplete. After the control system has begun energizing the motor, the fault detection circuit assures that the feedback circuit is complete and that the feedback signal is of the required polarity and is approximately proportional to the actual speed of the motor by comparing the feedback signal with a signal which varies as a function of the excitation voltage applied to the armature of the DC motor. When the fault detection circuit determines that the signal proportional to the excitation voltage is a preselected amount greater than the level of the feedback signal, the aforementioned normally energized switch is deenergized, resulting in deenergization of the motor.

FAULT DETECTION CIRCUIT FOR THE FEEDBACK OF A CONTROL SYSTEM

BACKGROUND OF THE INVENTION

This invention relates to motor control systems, and more specifically, to fault detection circuits which aid in preventing controlled motors of these systems from accelerating to excessive speeds.

It is well known that the rotational speed of adjustable speed DC motors is often controlled by electric motor control systems to meet the stringent requirements for driving complex industrial equipment such as machine tools, industrial cranes, rolling mills, and the like. A controlled variable such as the output speed of the DC motor is maintained at a preset value in a motor control system through the use of a closed-loop regulator which adjusts motor excitation in response to any changes in this speed. The accuracy of the control which is obtained from the closed-loop regulator is determined by the existence and accuracy of a speed feedback signal which is coupled to the regulator circuit from some type of a speed sensor, such as a tachometer generator. Where a difference exists between the level of the speed feedback signal and the level of a command signal indicating the desired output speed of the motor, the regulator causes the motor control system to adjust the actual speed of the motor, as by lowering or raising the voltage applied to the armature of a DC motor. Where the feedback signal level is greater than the command signal level, the regulator circuit determines that the motor is going faster than desired and thus slows down the motor, as by decreasing the voltage level applied to the armature of a DC motor. Where the regulator senses that the command signal level is greater than that of the speed feedback signal, the regulator determines that the motor is rotating slower than desired and attempts to increase its speed, for example by increasing the level of the voltage applied to the armature of a DC motor.

As noted above, whenever the regulator determines that the actual speed of the motor is less than the desired speed, the motor control system increases the speed of the motor and continues to increase it until the regulator determines that an appropriate speed has been reached. However, it has been found that occasionally for one reason or another, the feedback signal may not be connected to the regulator, the feedback signal may not be proportional to the actual speed of the motor or the polarity of the feedback signal as it is connected to the regulator may be reversed. For example, at the time of initial installation of a complex motor control system or at a time when maintenance is being performed on such a system it may occasionally happen that one or more connections from a speed sensor, such as a tachometer, to the regulator circuit are not completed, resulting in no feedback signal. Or it may happen that the connection of a pair of leads from the speed sensor may be interchanged, resulting in a feedback signal which is reversed in polarity. During an absence of the feedback signal, a reversal in the polarity of the feedback signal, or the occurrence of a feedback signal which is lower than it should be, the command signal is greater than the speed feedback signal so that the motor control system tries to accelerate the motor. This acceleration occurs even though the motor may be actually rotating at the proper speed or at a higher speed than required and can result in operating the motor at an undesirable, excessive speed.

SUMMARY OF THE INVENTION

Accordingly, it is an object of this invention to provide a fault detection circuit which prevents the operation of an adjustable speed DC motor if a feedback circuit of a closed-loop regulating system is open-circuited.

It is another object of this invention to provide a fault detection circuit which interrupts the operation of the adjustable speed DC motor if a feedback signal is of a polarity opposite to that intended.

It is yet another object of this invention to provide a fault detection circuit which initiates deceleration of the adjustable speed DC motor of an electric motor drive system if, for any reason during operation of the electric motor drive system, a feedback signal is lost.

Another object of this invention is to provide a fault detection circuit which deceleration of an adjustable speed DC motor if for any reason the value of a feedback signal of a closed-loop regulating system exceeds a preset value.

Still another object of this invention is to provide a fault detection circuit which initiates deceleration of an adjustable speed DC motor if the value of a feedback signal is significantly less than it should be for the actual speed of the motor.

Briefly stated, the fault detection circuit of this invention includes a switch which normally enables power to be applied to the motor by a motor control system. A feedback circuit which provides a feedback signal indicating the desired performance of the motor is one input to the fault detection circuit, while a signal which varies as a function of the energy applied to the motor from a voltage supply is another input to the fault detection circuit.

In accordance with one aspect of this invention, means are provided for establishing first and second electrical potential levels, and the feedback circuit is connected to the first potential level. An electrical conductor having a substantially higher impedance than that of the feedback circuit is connected to the second electrical potential. A point on the feedback circuit and a point on the electrical conductor are connected in circuit which determines whether or not the switch enables power to be applied to the motor. When the feedback circuit is discontinuous prior to energizing the motor, the electrical conductor couples the second potential level to the switch to prevent voltage from being applied to the motor.

In accordance with another aspect of this invention, the fault detection circuit includes a comparison circuit which responds to the difference between the signal levels of the feedback signal and the signal which varies the function of the energy applied to the motor. Whenever the condition of the feedback circuit causes the level of the signal which varies as a function of the energy applied to the motor to be at least a preselected amount greater than the level of the feedback signals, the switch is biased so as to cause the motor to decelerate.

The specification concludes with claims particularly pointing out and distinctly claiming the subject matter of this invention. The organization and manner and process of making and using this invention, together with further objects and advantages of this invention, may be best understood by referring to the following description taken in conjunction with the accompanying drawings.

DESCRIPTION OF THE PREFERRED EMBODIMENT

Figure 1:
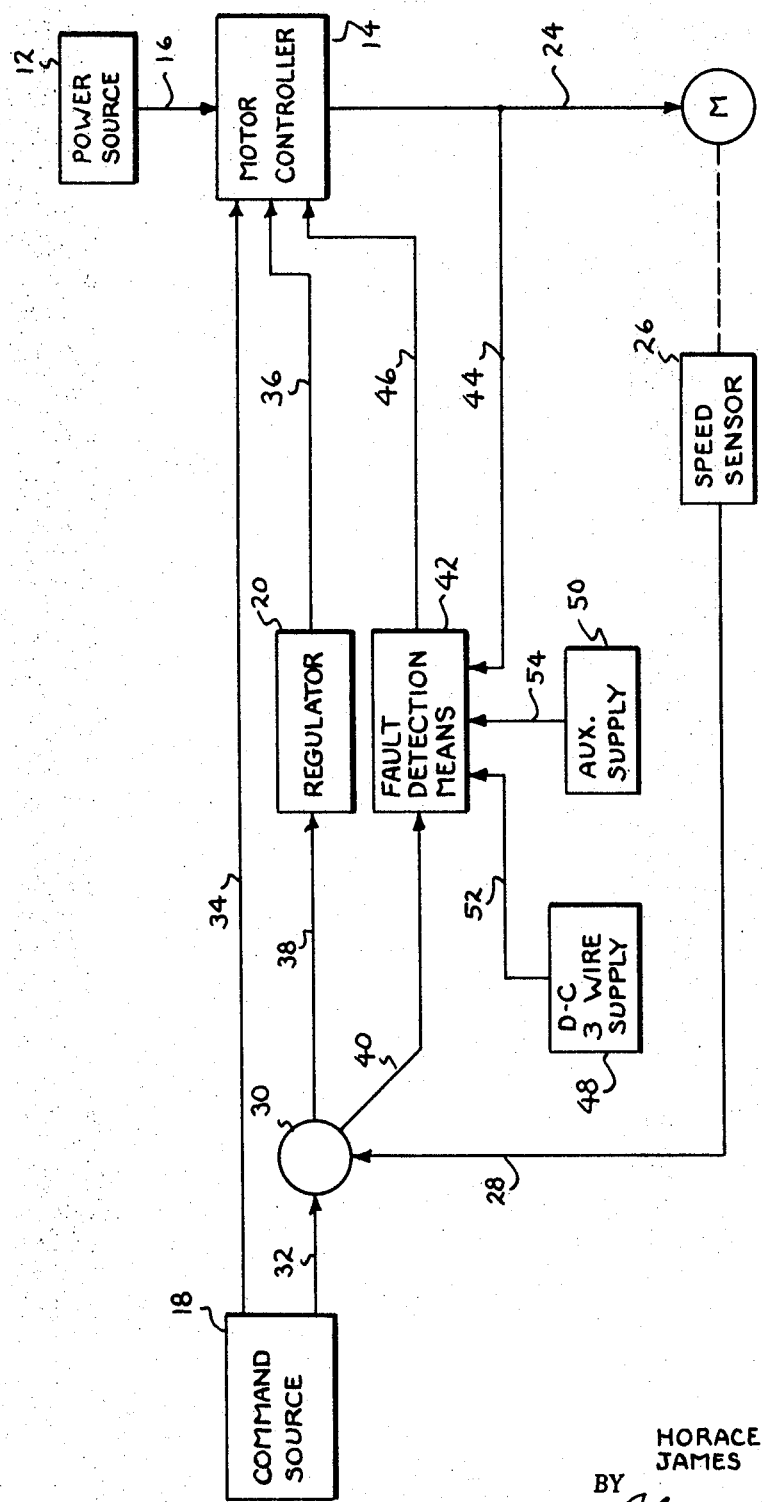
FIG. 1 is a block diagram of a motor control system which includes the fault detection circuit of this invention.

While this invention can be used for any type of a control system in which it is desired to determine the integrity of a feedback circuit, and in any control system in which the level of a feedback signal is proportional to the level of excitation of a load for the system, this invention will be explained with reference to a motor control system in which it is found to be highly desirable. Considering the drawings now in more detail, FIG. 1 is a block diagram of a conventional, closed-loop, speed regulated motor control system which includes a preferred embodiment of this invention. A power source 12 supplies electric energy to a motor excitation controller 14 through a power connection 16. The motor excitation controller 14 may comprise any convenient means for providing the electrical energy to a motor. For example, it may comprise a dynamoelectric generator or a magnetic amplifier for supplying direct-current electrical energy to a DC drive motor. It might also comprise a static power source such as a DC source using controlled rectifying devices to convert AC electrical energy to DC electrical energy or may comprise a static alternating-current energy source such as an inverter or a cycloconverter which supply energy through controlled rectifying devices to a load. In the preferred embodiment, the motor controller 14 comprises a source of direct-current electric energy which is applied to the armature of a DC motor.

In response to input signals from a command source 18 and a regulator circuit 20, the motor controller 14 meters electric power to a drive motor 22 through an output connection 24. The command source 18 may comprise any convenient means for generating reference signals having a magnitude proportional to the desired performance of the drive motor 22. For example, it may comprise a regulated power supply, a computer, a tachometer generator driven by a master motor control system, etc.

Since the speed is to be the regulated quantity of the motor control system, a speed sensor 26 provides a feedback signal proportional to the rotational speed of the drive motor 22. This speed sensor 26 may comprise a direct-current or alternating-current tachometer which is driven by the motor 22, or it may comprise any convenient means for providing an output signal having a level which varies as a function of the speed of the drive motor 22. Where another parameter of a motor control system or of another type of system is to be monitored, suitable sensing apparatus can be included in the feedback circuit. A feedback connection 28 conducts this feedback signal to a summing junction 30 where the signal is compared with a speed command signal from the command source 18 which is proportional to the desired speed of the drive motor 22, this comparison producing an error signal. The speed command signal is connected to the summing junction 30 by a speed command connection 32. An error signal connection 38 conducts the error signal to the regulator 20 from he summing junction 30. A direction command connection 34 conveys qualitative commands indicating the desired direction of rotation of the motor from the command source 18 to the electric motor controller 14. A velocity signal, indicative of a correction to be made in the excitation of the drive motor 22 so that its speed corresponds to the speed command signal, is introduced into the electric motor controller through a velocity connection 36 from the regulator circuit 20. The velocity signal is an amplified derivative of an error signal developed in the summing junction 30.

In accordance with one aspect of this invention, the motor control system also includes a fault detection circuit 42 which determines that the feedback circuit is complete, hat the feedback signal is of the required polarity and is approximately proportional to the actual speed of the drive motor 22 whenever the drive motor 22 is energized by the motor control system. To enable the fault detection circuit 42 to sense the feedback signal, a fault detection signal proportional to the feedback signal is coupled through connection 40 to the fault detection circuit 42. A second fault detection signal, which varies as a function of the energy applied to the drive motor 22, is coupled to the fault detection circuit 42 by a second fault connection 44. Where the drive motor 22 is a DC motor, the fault connection 44 provides a signal which is proportional to the voltage applied to the armature of the motor. When a DC shunt wound motor is operated in its lower or base speed range, the speed of rotation of this motor is adjusted by varying the level of the voltage applied to the armature. The higher the level of the armature voltage, the faster the DC motor rotates. Thus, the output from the speed sensor 26 should be greater as well. By comparing the level of the signal proportional to the armature voltage with the level of the signal from the speed sensor, both of which should vary in proportion to changes in the rotational speed of the motor, the fault detection circuit 42 can determine the integrity of the feedback circuit. Whenever the level of the armature voltage signal is at least a preselected amount greater than the level of the speed feedback signal, the fault detection circuit 42 determines that a fault has occurred in he feedback circuit and therefore the fault detection circuit 42 causes the motor to decelerate. For this reason, a fault output connection 46 is required between the fault detection circuit 42 and the motor controller 14. Because the level of the signal proportional to the armature voltage is required to be a preselected amount greater than the level of the speed feedback signal for fault indication, the fault detection circuit 42 is operational in the higher speed field adjustment range of the motor where the armature voltage is held constant as the speed increases.

The fault detection circuit 42 can cause the motor to decelerate in a number of different ways. For example, the fault detection circuit 42 might include a switch which disconnects the controller from the power line or a switch which disconnects the drive motor 22 from the motor controller 14 itself. The drive motor 22 might also be caused to decelerate by disconnecting the command source 18 from the remaining portion of the motor control system or by disconnecting the regulator 20 from the motor controller 14. Another alternative might be to diminish the level of the signals from the command source 18 or from the regulator 20. Still another alternative might be to have the fault detection circuit 42 cause an alternate feedback circuit to be connected to the summing junction 30. Those skilled in the art will recognize numerous other possibilities for decelerating a controlled motor or for otherwise deenergizing a load of a control system.

As will be explained more fully below with respect to FIG. 2, the preferred embodiment of the fault detection circuit 42 includes a DC three-wire supply 48 for energizing the fault detection circuit 42, and an auxiliary supply 50, these supplies being coupled to the fault detection circuit 42 by means of electrical connections 52 and 54, respectively.

Briefly, the operation of the motor control system shown in FIG. 1 is as follows:

When the motor control system is started-up, a signal from the command source 18 through the connection 34 indicates the direction in which the drive motor 22 is to rotate. The command source 18 also provides a signal through the connection 32 to the summing junction 30 which determines the desired speed of the drive motor 22. This command signal is compared at the summing junction with the speed feedback signal from the speed sensor 26, and an error signal proportional to the difference between the command and speed feedback signal is coupled to the regulator circuit 20. The output from the regulator circuit 20 is the velocity signal which determines the amount by which the excitation of the drive motor 22 should be changed to produce the desired rotational speed of this motor.

In the fault detection circuit 42 the speed feedback signal coupled through connection 40 is compared with a signal proportional to the armature voltage applied to the drive motor 22. When the armature voltage signal level is a preselected amount greater than the level of the speed feedback signal, the fault detection circuit 42 causes the drive motor 22 to decelerate.

Figure 2:
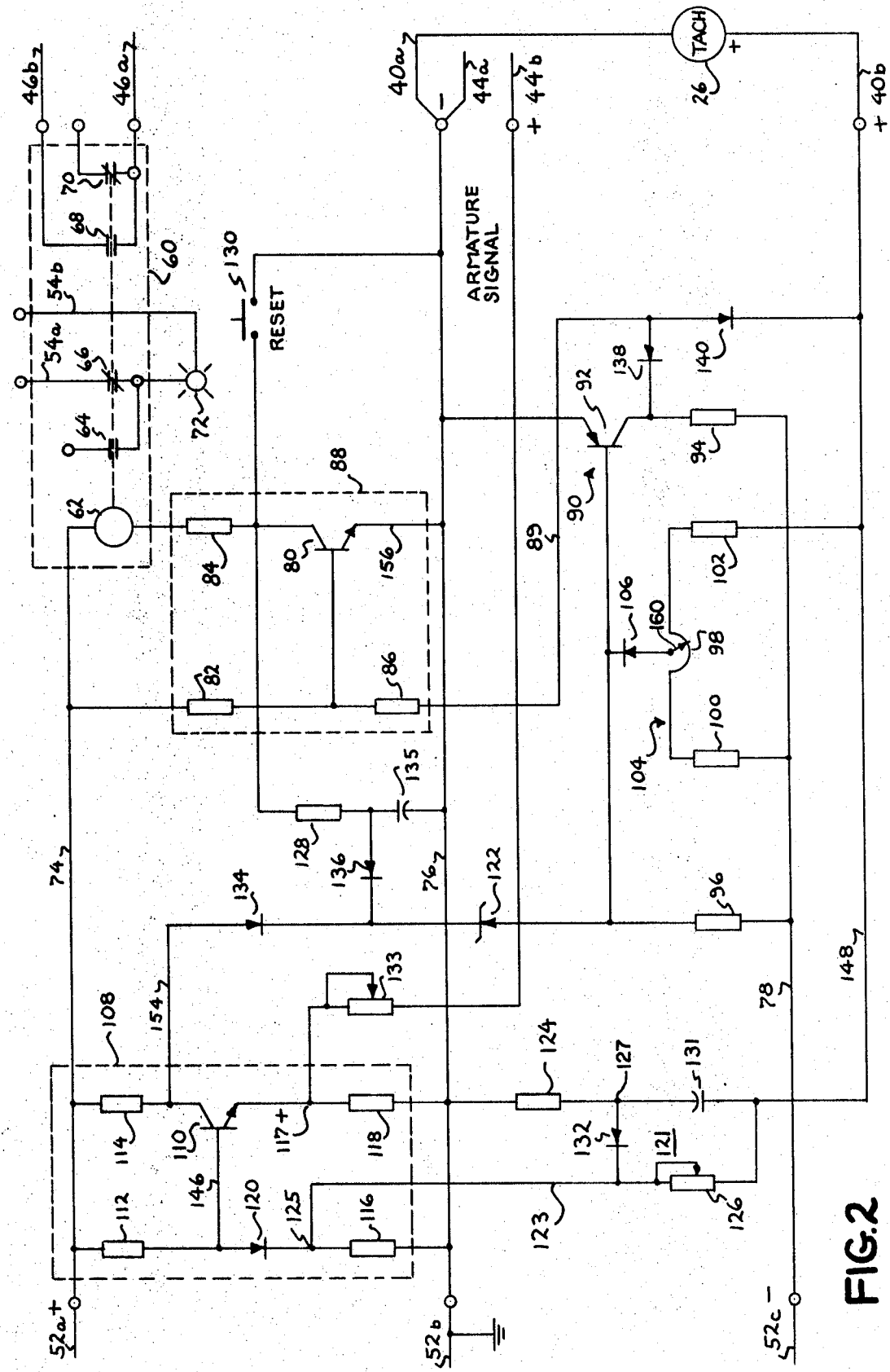
FIG. 2 is a schematic diagram showing a fault detection circuit comprising one embodiment of this invention.

FIG. 2 shows a preferred embodiment of the fault detection circuit of this invention. Where applicable in FIG. 2, numbers appearing in FIG. 1 are employed to represent those elements common to both FIGS. Connections shown in FIG. 1 as a single line and identified by a single numeral are, in FIG. 2, identified by that numeral with an alphabetic subscript if a plurality of current-carrying paths comprises the connection shown in FIG. 1. For example, connection 44 of FIG. 1 comprises two current paths identified in FIG. 2 as 44a and 44b. Circuit identification numbers within the fault detection circuit 42 as contained in FIG. 2 are not related to the connection identification numbers employed in FIG. 1.

The fault detection circuit of this invention basically comprises a switching relay 60 which is normally energized by a static switching circuit 88. The relay 60 includes a coil 62 and four contacts 64, 66, 68 and 70 which are employed to yield output signals from the fault detection circuit itself. To provide for fully failsafe operation of the fault detection circuit, the coil 62 is normally energized during the operating of the motor control system and is deenergized upon the occurrence of a fault. By way of example, the four contacts are shown in typical circuit configurations which might be used for drive systems. Connections 54a and 54b conduct power from the auxiliary source 50 of FIG. 1 and through the contact 66 through a signal light 72 which is energized upon occurrence of a fault. The contact 68 is connected through connections 46a ad 46b to the motor controller 14 of FIG. 1 to initiate the decelerating of the drive motor 22 upon the occurrence of a fault.

A positive bus 74, a common bus 76, and a negative bus 78 carry DC power for the operation of the fault detection circuit through the connections 52a, 52b and 52c, respectively, from the DC three-wire supply 48 of FIG. 1.

A transistor 80 and bias resistors 82, 84, and 86 are included in the switching circuit 88. A conductor 89 in the bias circuit of the transistor 80 is coupled through the diode 138 to a static switching circuit 90 which includes a transistor 92 and bias resistors 94 and 96. The transistor 92 is normally conducting during the operation of the motor control system, and then the diode 138 is forward biased it connects the conductor 89 through the transistor 92 to the common bus 76 to keep the transistor switch 80 in its saturated conducting state. As explained above, the relay coil 62 is energized at this time, indicating that no fault has been detected.

The conductor 89 is also coupled though a diode 140, a connection 40b, a tachometer generator 26 which is used as a speed sensor, and through a connection 40a to the common bus 76. In accordance with another aspect of this invention, when the diode 140 is forward biased and the feedback circuit between its cathode and the common bus 76 is complete, the conductor 89 is connected through the low impedance output circuit of the tachometer 26 to the common bus 76 to cause the transistor switch 80 to continue conducting and energizing the coil 62.

In further accordance with this aspect of the invention, the diode 140 also connects the conductor 89 through a conductor or bus 148 and through an electrical impedance 104, which includes a resistor 102, a potentiometer 98, and resistor 100 to the negative bus 78. The impedance value of the total electrical impedance 104 is substantially higher than that of the output circuit of the tachometer generator 26. Because of this higher impedance level, as long as the output circuit of the tachometer generator 26 is complete prior to starting up the motor shown in FIG. 1, the tachometer generator shunts the conductor 89 and the bias circuit of the transistor 80 to the potential level of the common bus 76, keeping the transistor 80 turned on and the coil 62 energized. However, if the output circuit of the tachometer generator 26 is not completed to the summing junction 30 of FIG. 1, a diode 140 is connected through the electrical impedance 104 to the potential level of the negative bus. In this instance, the diode 138 is in reverse bias by virtue of the potential level of the negative bus and the transistor 80 is biased off as well. The coil 62 is deenergized, preventing the drive motor 22 from being excited.

In accordance with still another feature of this invention, the slide wire of the potentiometer 98 is coupled through a diode 106 to the base circuit of the transistor 92. As will be explained more fully below, after the drive motor 22 of FIG. 1 has started up and the tachometer generator has an output of the polarity shown in FIG. 2 reverse biasing the diode 140, the voltage divider made up of the electrical impedance 104 senses the output level of the tachometer generator 26. When the output level of the tachometer generator 26 is above a preselected value, determined by the position of the slide wire 160 of the potentiometer 98, the diode 106 is forward biased, turning off the transistor 92 which results in turning off the transistor 80 and deenergizing the coil 62.

A comparison circuit 108 of the fault detection circuit includes transistor 110 and bias resistors 112, 114, 116, and 118. A diode 120 is connected from cathode to anode from the resistor 116 to the base electrode of the transistor 110.

The speed feedback signal from the output circuit of the tachometer generator 26 is coupled through the conductor 148, a capacitor filter circuit 121, and a conductor 123 to a junction 125 between the resistor 116 and the diode 120. The capacitor filter circuit includes a capacitor 131 which is connected from anode to cathode of a diode 132 to the conductor 123. A rheostat 126 is connected across the capacitor 131 and the diode 132. The position of the slide wire on the rheostat 126 determines the level of the speed feedback signal which is coupled to the comparison circuit 108. As will be explained more fully below, the level of the speed feedback signal is adjusted so that it corresponds with the level of the armature voltage signal to forward bias the transistor 110 when the tachometer feedback circuit is in good working order. A resistor 124 connects a junction 127 between the capacitor 131 and the diode 132 to the common bus 76.

A signal proportional to the excitation level of the motor is connected to the connections 44a and 44b. By way of example, an armature signal, proportional to the level of the voltage applied to the armature of a DC motor is coupled through a rheostat 133 to a junction 117 between the resistor 118 and the emitter of the transistor 110. The slide wire of the rheostat 133 can be adjusted to select the level of the armature signal which is actually coupled to the emitter circuit of the transistor 110. By adjusting both of the rheostats 126 and 133, appropriate levels of speed feedback signal and armature signal can be obtained to normally forward bias the transistor 110 while the feedback circuit is operating as desired.

The collector of the transistor 110 is coupled through a diode 134 of the cathode of a Zener diode 122. The Zener diode 122 breaks down when the transistor 110 becomes nonconducting and the voltage level at the positive voltage bus 4 is coupled through to the diode 134 to this Zener diode. When the Zener diode 122 breaks down, a positive voltage is coupled to the base circuit of the PNP transistor 92 turning it off. The diode 138 then connects the bias circuit of the transistor 80 through the resistor 94 to the negative bus 78, turning off the transistor 80 and causing the coil 62 to be deenergized.

The fault detection circuit further includes a reset circuit for use following correction of the fault. This reset circuit comprises a reset switch 130 which is connected across the collector and emitter circuit of the transistor 80. In this circuit, a resistor 128 is connected from the collector electrode of the transistor 80 through a capacitor 135 to the common bus 76. The capacitor 135 is charged through the resistor 128 when he transistor 80 is turned off. The diode 136 having its anode connected between thè capacitor 135 and the resistor 128 and its cathode connected between the diode 134 and the Zener diode 122 limits the voltage level to which the transistor 80 is exposed. The anode voltage of the diode 136 rises on the RC time constant of the series-connected resistor 128 and capacitor 135 when the transistor 80 ceases conduction. When this anode voltage attains a value in excess of the forward voltage drop of the diode 136 and above the voltage breakdown value of the Zener diode 122, a circuit is established through the resistor 96 to the negative bus 78. This raises the voltage level at the base of the transistor 92, discontinuing conductance in the transistor 92 and maintaining the transistor 80 in a nonconducting state. Operation of the reset switch 130 discharges the capacitor 135 and lowers the anode voltage of the diode 136 to a value below the Zener diode 122 breakdown voltage. This restores the operational conditions of the transistor 92 which, when restored to conduction, reestablishes operation of the transistor 80.

OPERATION OF FIG. 2

Assume that the drive motor 22 of FIG. 1 is at standstill and that the motor control system which controls this drive motor is in operating condition. With power applied to the fault detection circuit of FIG. 2 and with the feedback circuit between the connections 40a and 40b complete, the transistor 80 is biased in its conducting state because the conductor 89 is connected through the diode 140 and the output circuit of the tachometer 26 to the common bus 76. At this time, the transistor 92 and the transistor 110 in the comparison circuit 108 are turned on as well. Thus, the coil 62 is energized and the contacts 68 and 70 allow power to be applied to the motor when it is desired to start up the motor.

In the event that a discontinuity has occurred in the output circuit of the tachometer 26, either due to improper installation or maintenance of the motor control system or for some other reason, the transistor 80 is biased in its nonconducting state. The conductor 89 is connected through the diode 140 and the electrical impedance 104 to the negative bus 78. The potential level at the negative bus 78 causes the diode 138 to be reverse biased so that the conductor 89 in the bias circuit of the transistor 80 has no path to the common bus 76. The coil 62 is deenergized at this time and the contacts of the relay 60 prevent power from being applied to the drive motor 22 of FIG. 1.

After power has been applied to the drive motor 22, assumed to be a DC shunt wound motor for the present discussion, a signal proportional to the armature voltage applied to the motor is coupled through the connections 44a and 44b across the resistor 118 in the emitter circuit of the transistor 110. The speed feedback signal is coupled through the capacitor circuit 121 and across the resistor 116 in the base circuit of the transistor 110. The signal levels of the armature signal across the resistor 118 and the speed feedback signal across the resistor 116 are adjusted so that the base to emitter junction of the transistor 110 is forward biased, turning this transistor full on, when the feedback circuit is operating as required. However, should a fault occur in the feedback circuit which would cause the motor control system to attempt to accelerate the motor, the transistor 110 is turned off and the voltage level at the positive bus 74 is coupled through the diode 134 to breakdown the zener diode 122. The resulting positive voltage at the base of the transistor 92 turns off this transistor, causing the bias circuit of the transistor 80 to be connected through the diode 138 and the resistor 94 to the negative bus 78. Since the diode 140 is reverse biased by the speed feedback signal, the potential level at the negative bus 78 causes the transistor 80 to be turned off and the coil 62 is deenergized. Thus, upon the occurrence of a fault while the drive motor is energized, the relay 60 causes the motor control system to decelerate the motor in one of the manners described above with respect to FIG. 1.

Let it be assumed that while the drive motor 22 of FIG. 1 is energized the output from the tachometer generator 26 is either substantially decreased or is altogether lost, as where a tachometer lead is disconnected from the motor control system. Under these assumed conditions, the capacitor 131 at first contains a charge corresponding to the level of the speed feedback signal derived from he tachometer generator 26 prior to the diminution or loss of this signal. The charge of the capacitor 131 is dissipated at a rate which is dependent on the amount by which speed feedback signal on the conductor 148 is decreased. A diminution of the speed feedback signal level results in a discharge of the capacitor 131 through the resistor 124 and the impedance 104 and the consequent deenergization of the relay 60 as detailed hereinafter. The voltage across the resistor 118, caused by the armature signals, remains at its previous level, this voltage being positive in polarity at the emitter of the transistor 110. Since the positive potential at the junction 125 is now decreased by the lower voltage across the capacitor 131 which causes the diode 132 to be back biased, the positive voltage at the emitter of the NPN transistor 110 turns off this transistor. The coil 62 is deenergized. In this manner, the comparison circuit 108 compares the level of the speed feedback signal with the level of the armature signal and causes the relay 60 to become deenergized when the level of the speed feedback signal at the junction 125 is not large enough with respect to the level of the armature signal at the junction 117 to forward bias the base-emitter junction of the transistor 110.

When the drive motor 22 of FIG. 1 is undergoing acceleration, with the speed feedback signal from the tachometer generator 26 of FIG. 2 maintaining the proper ratio to the armature signal, the capacitor 131 prevents motor control system shutdown due to minor, transient discrepancies between the proportions of the armature signal level and the speed feedback signal level.

It should be recognized that the types of feedback faults protected against by the portion of the fault detection circuit discussed above are those which would cause a motor control system of the type disclosed in FIG. 1 to accelerate the motor. That is, these are faults which result in a lower level of feedback signal than should be received for the actual speed of rotation of the drive motor 22. A fault of this type includes a reversal of the leads of a tachometer generator, resulting in what is known as a positive feedback signal in the feedback circuit of the drive system. As a result of the reversal of the leads of the tachometer generator 26, a negative polarity speed feedback signal is applied across the resistor 116, which in combination with the positive polarity armature signal at the junction 117 reverses the bias on the base-emitter junction of the transistor 110, turning off this transistor and thereby causing the coil 62 to become deenergized.

The fault detection circuit of this invention also protects the motor control system by causing it to decelerate when the speed feedback signal from the tachometer generator 26 indicates that the motor is rotating at a higher than desirable speed. In this instance, the speed feedback signal forward biases the diode 106 at the slide wire of the potentiometer 98 and couples a positive voltage to the base of the PNP transistor 90. This positive polarity voltage turns off the transistor 90 and once again causes the bias circuit of the transistor 80 to be connected through the diode 138 and the resistor 94 to the negative polarity bus 78. The coil 62 is deenergized, causing the relay 60 to effect a deceleration of the drive motor.

Among the numerous advantages of this invention is the fact that the fault detection circuit can be used to detect a discontinuity in a feedback circuit of a control system both prior to the time when the feedback circuit is providing feedback signals and after the signals have occurred. It also detects inadequate feedback signals caused by other factors. The preferred embodiment of the fault detection circuit is failsafe in that possible failures of this circuit, such as a loss of its power supply, cause this circuit to indicate that a fault condition has occurred In the event of a loss of power from the DC supply 48, one or more of the normally conducting transistors 80, 92, and 110 become nonconducting, causing the coil 62 to become deenergized so that the relay 60 operates as if a fault had occurred in the feedback circuit.

This invention is not limited to the particular details of the preferred embodiment illustrated. It is contemplated that many variations, modifications, and applications of this invention will occur to those skilled in the art of designing closed-looped, regulated control systems. For example, the feedback signal may comprise a DC signal either from a DC feedback circuit, such as a DC tachometer or a rectified AC signal from an AC tachometer. It is, therefore, intended that the appended claims cover those variations, modifications, and applications which do not depart from the true spirit and scope of this invention.

We claim:

1. A motor control system which controls the speed of a drive motor in response to the output of a speed sensor coupled to the motor, and fault detection circuit means comprising, in combination:

a. switching means coupled to said motor control system and means for maintaining said switching means in a first energization state during the normal operation of said motor control system to enable power to be applied to said motor;

b. the speed sensor having an output circuit;

c. means for establishing first and second electrical potential levels;

d. means for connecting a first side of said output circuit to said first potential level and rectifier means for connecting a second side of said output circuit to said means for energizing said switching means, said rectifier means normally conducting during the normal operation of the motor control system prior to startup of said motor so as to connect said means for maintaining said switching means through said output circuit to said first potential level;

e. electrical conductor means having a substantially higher impedance than said output circuit, means for connecting one side of said electrical conductor to said second electrical potential level and means for connecting said second side of said output circuit to the other side of said electrical conductor, said second potential level having such a value that in the event that said rectifier is forward biased but is not connected through said output circuit to said first potential level, said second potential level causes said means for maintaining said switching means to maintain said switching means in a second energization state so that power is unable to be applied to the motor.

2. A motor control system which includes a drive motor, a voltage supply for applying energy to said motor in proportion to the desired speed of said motor, and speed sensor means coupled to said motor for providing a speed signal which varies as a function of the actual speed of said motor, and an improved fault detection circuit, comprising, in combination:

a. switching means coupled to said motor control system and means for maintaining said switching means in a first energization state during the normal operation of said motor control system to enable the motor to be energized by said motor control system;

b. means for coupling a first signal from said voltage supply to said fault detection circuit, said fist signal varying as a function of the energy applied to said motor by said voltage supply;

c. means for coupling the speed signal to said fault detection circuit;

d. comparison circuit means connected to said means for maintaining said switching means, said comparison circuit responding to the difference between the signal levels of the first signal and the speed signal to cause said means for maintaining said switching means to change the energization state of said switching means when the level of the first signal is at least about a preselected amount greater than the level of the speed signal, thereby causing said motor to decelerate.

3. The improved motor control system according to claim 2 in which said means for coupling a speed signal includes a capacitor circuit for preventing transient changes in the speed signal level from affecting said comparison circuit.

4. The improved motor control system according to claim 2 which also includes means responsive to the level of the speed signal and connected to said means for maintaining said switching means to cause said switching means to be maintained in the second energization state when the speed signal is greater than a preselected level.

5. The improved motor control system according to claim 2 wherein said speed sensor has an output circuit having a first side and a second side and said motor control system includes means for establishing first and second electrical potential levels, means for connecting the first side of said output circuit to said first source of electrical potential, and rectifier means for connecting the second side of said output circuit to said means for maintaining said switching means, said rectifier means normally conducting during normal operation of said motor control system prior to startup of said motor so as to connect said means for maintaining switching means through said output circuit to said first potential level;

electrical conductor means having a substantially higher impedance than said output circuit, means for connecting one side of said electrical conductor to said second electrical potential level and means for connecting said second side of said output circuit to the other side of said electrical conductor, said second potential level having such a value that in the event that said rectifier is forward biased but is not connected through said output circuit to said first potential level, said second potential level causes said means for maintaining said switching means to maintain said switching means in a second excitation state so that power is unable to be applied to said motor.

6. For use in a closed-loop, regulated control system which controls a preselected parameter of a load in response to the output of a sensor of this parameter, the output normally varying as a function of the preselected parameter as the energization level of the load changes, fault detection circuit means comprising, in combination:

a. switching means coupled to the motor control system and means for maintaining the switching means in a first excitation state during the normal operation of the control system to enable power to be applied to the load;

b. means for sensing a preselected parameter of the load, said means for sensing having an output circuit, c. means for establishing first and second electrical potential levels;

d. first means for connecting a first side of the output circuit to said first potential level and second means for connecting a second side of said output circuit to said means for energizing said switching means, said second means normally conducting current during the normal operation of the control system prior to the energization of the load so as to connect said means for maintaining said switching means through said output circuit to said first potential level;

e. electrical conductor means having a substantially higher impedance than said output circuit, third means for connecting one side of said electrical conductor to said second potential level and fourth means for connecting said second side of said output circuit to the other side of said electrical conductor means, said second potential level having such a value that in the event said second means is conducting current but said output circuit has been interrupted, said second potential level causes said means for maintaining said switching means to maintain said switching means in a second excitation state at which electrical energy is unable to be applied to the load.

7. For use in a closed-loop, regulated control system which includes a load, a voltage supply for applying electrical energy to said load in proportion to the level of a preselected parameter of said load, and means for providing a feedback signal which varies as a function of the preselected parameter of the load, an improved fault detection circuit, comprising, in combination:

a. switching means coupled to said control system and means for maintaining said switching means in a first excitation state during the normal operation of said control system to enable said load to be energized by said control system;

b. means for coupling a first signal from said voltage supply to said fault detection circuit, said first signal varying as a function of the energy applied to the load by said voltage supply;

c. means for coupling a feedback signal to said fault detection circuit; and d. comparison circuit means connected to said means for maintaining said switching means, said comparison circuit responding to the difference between the signal levels of the first signal and the feedback signal to cause said means for maintaining said switching means to change the excitation state of said switching means when the level of said first signal is at least a preselected amount greater than the level of the feedback signal, thereby decreasing the energization of the load.

8. In a drive system including a motor and a motor control system for controlling power input to the motor so as to thereby control the speed of the motor, a fault detection system comprising:

a. switching means shiftable between a first condition interconnecting the control system and the motor to permit normal operation of the motor in response to the motor control system and a second condition in which energization of the motor is prevented, means biasing said switching means to aid second condition, means responsive to current flow therein to shift said switching means to said first condition, means responsive to the actual speed of the motor for producing a first fault detection signal proportional to the speed of the motor, means responsive to the output of said motor control system for producing a second fault detection signal proportional to the magnitude of said output, a power supply, and circuit means interconnecting said power supply, said current responsive means, said actual speed responsive means, and said motor control system output responsive means such that current flows through said current responsive means to permit operation of the motor only so long as the impedance of said actual speed responsive means remains below a predetermined level and the steady state second fault detection signal does not exceed the first fault detection signal by more than a predetermined amount.